F. M. HAHN.
DOOR HANGER.
APPLICATION FILED APR. 23, 1915.
1,144,901.
Patented June 29, 1915.
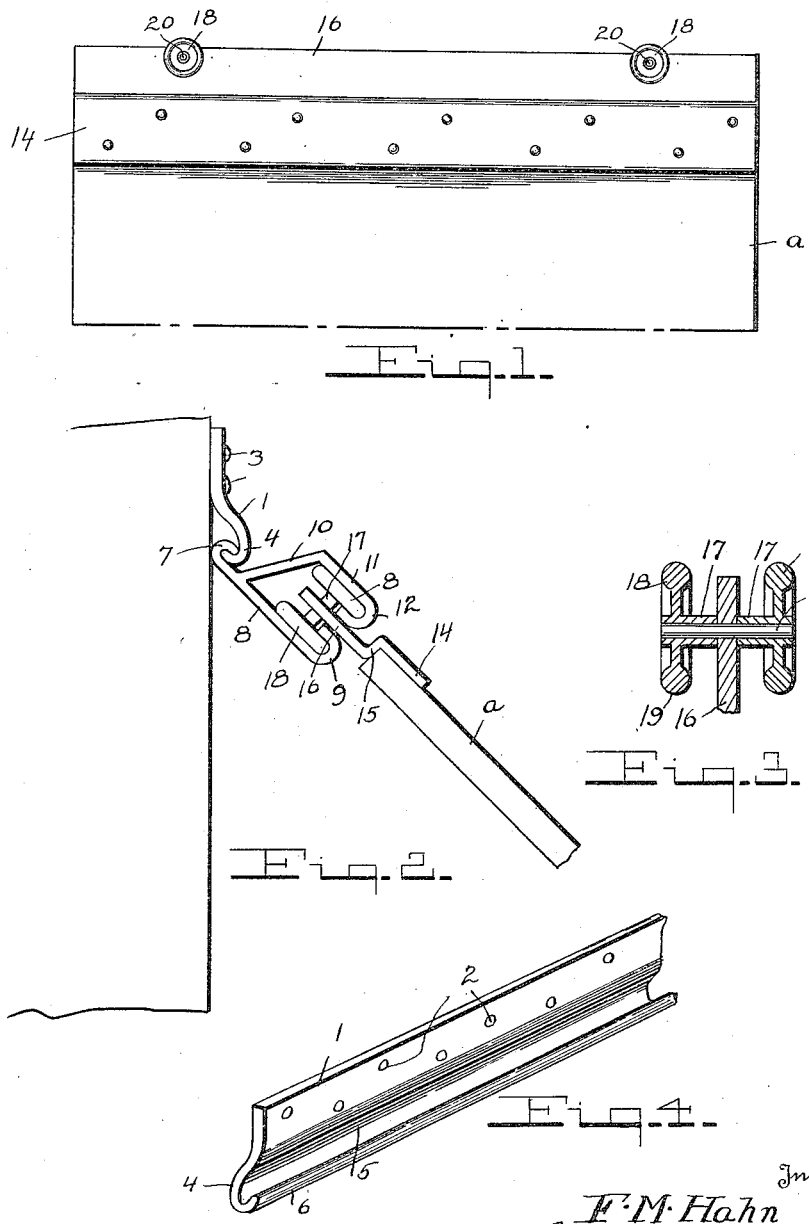

UNITED STATES PATENT OFFICE.

FRANK M. HAHN, OF DOLAND, SOUTH DAKOTA.

DOOR-HANGER.

1,144,901.  Specification of Letters Patent.  Patented June 29, 1915.

Application filed April 23, 1915. Serial No. 23,405.

*To all whom it may concern:*

Be it known that I, FRANK MARTIN HAHN, a citizen of the United States, residing at Doland, in the county of Spink and State of South Dakota, have invented certain new and useful Improvements in Door-Hangers; and I do hereby declare the following to be a full, clear, and exact description of the invention, such as will enable others skilled in the art to which it appertains to make and use the same.

This invention relates to door hangers, the principal object of the invention being to provide a simple sliding door hanger which will permit the door to be swung outward from the building, and which can be readily disconnected from the supporting track.

Another object of the invention is to provide a door hanger of simple construction which can be connected to a door frame without the use of special tools, and which forms a weather tight connection to exclude rain, snow and birds or animals.

The foregoing and other objects may be attained by means of the construction illustrated in the accompanying drawings, in which—

Figure 1 is a view in elevation of the upper portion of the door, Fig. 2 is an edge view of the door and hanger, Fig. 3 is a sectional view taken through trolley wheels and the supporting device therefor, Fig. 4 is a perspective view of a portion of the supporting bar for the hanger.

Referring to the drawings, the numeral 1 designates the supporting bar for the hanger provided with a plain flange having perforations 2 therein for fastening nails or screws 3, and said supporting bar being provided with a bent portion 4 forming a longitudinal groove 5. The supporting bar 1 is secured above the door opening with the terminal edge 6 inward as shown in Fig. 2.

The track member of the hanger comprises a hook 7 disposed in the groove 5 of the supporting plate 1 and the track is provided with a plain rear plate 8, the lower edge of which is bent upward as at 9 to form a U-shaped track on which the wheels are adapted to run. The outer member of the track comprises the inclined wall 10 having the downwardly extending front wall 11 provided with the curved portion 12 which forms a groove or track for the other wheel connected to the door.

The door *a* has connected to its upper edge a bracket 14 and inwardly extending offset portions 15 and a centrally disposed upwardly extending flange 16. Mounted at intervals in the flange 16 are the axles 17 of the spaced wheels 18. The axles 17 of the wheels 18 are hollow, and upon their outer ends are the integral wheels 18 having rounded peripheries 19 to conform to the curved grooves in the tracks 9 and 12. A pin 20 extends through the hollow axles 17 and through a perforation in the flange 16 of the bracket 14, said pin being held against displacement by the two members 8 and 11 of the track.

From the foregoing it will be obvious that the door hanger may be swung out into the position shown in Fig. 2, and can be readily disconnected from the supporting members 1.

Various changes may be made in the details of construction without departing from the spirit and scope of the invention as defined in the claims.

What is claimed is:—

1. A door hanger comprising a supporting bar having a plain flange adapted to be secured to the upper edge of a door opening and an inwardly bent portion forming a groove, a track member having a plain rear plate, an outwardly extending downturned portion on the upper edge of said plate forming a hook member, said hook member being adapted to engage the groove of said supporting bar, whereby said track member can be removably and pivotally supported, the flange of said supporting bar and the rear plate of said track member being in the same plane, an inclined wall extending outwardly from said rear plate near the upper portion thereof, a front plate extending down from said inclined wall, upturned portions on said front and rear plates forming a track member, whereby a door can be slidably suspended thereon.

2. A door hanger comprising a supporting bar having a flange and a bent portion, said bent portion forming a groove, a track member having a rear plate, a downturned portion on the upper edge of said rear plate adapted to engage said groove, an inwardly extending upturned portion on the lower part of said plate, an inclined wall extending outwardly from said plate near the upper edge thereof, a front plate extending downwardly from said inclined wall, an inwardly extending upturned portion on said front plate, said upturned portions of the rear and front plates being in the same plane and forming a track, and a bracket having an offset portion, a downwardly extending shank from said offset portion, said offset and shank being adapted to be secured to a door, a pair of spaced wheels rotatably mounted on the upper portion of said bracket, said wheels adapted to engage said track member.

In testimony whereof I affix my signature in presence of two witnesses.

FRANK M. HAHN.

Witnesses:
GEO. GROSS,
JOHN H. LEVSAN.

Copies of this patent may be obtained for five cents each, by addressing the "Commissioner of Patents, Washington, D. C."